United States Patent
Furuskär et al.

(10) Patent No.: US 8,897,714 B2
(45) Date of Patent: Nov. 25, 2014

(54) METHOD OF ESTIMATING PATH LOSS FOR A CHANNEL

(75) Inventors: Anders Furuskär, Stockholm (SE);
Kristina Jersenius, Linköping (SE);
Jessica Östergaard, Stockholm (SE);
Arne Simonsson, Gammelstad (SE);
Magnus Thurfjell, Luleå (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 626 days.

(21) Appl. No.: 13/145,255

(22) PCT Filed: Jan. 20, 2009

(86) PCT No.: PCT/SE2009/050055
§ 371 (c)(1),
(2), (4) Date: Jul. 19, 2011

(87) PCT Pub. No.: WO2010/085185
PCT Pub. Date: Jul. 29, 2010

(65) Prior Publication Data
US 2011/0281525 A1   Nov. 17, 2011

(51) Int. Cl.
*H04B 17/00* (2006.01)
*H04W 52/24* (2009.01)
*H04W 52/10* (2009.01)
*H04W 52/14* (2009.01)

(52) U.S. Cl.
CPC .......... *H04B 17/0042* (2013.01); *H04B 17/009* (2013.01); *H04W 52/242* (2013.01); *H04W 52/10* (2013.01); *H04W 52/143* (2013.01)
USPC ....................................... 455/67.11; 455/63.1

(58) Field of Classification Search
CPC .................................................... H04W 52/242
USPC ............................................... 455/67.11, 63.1
See application file for complete search history.

(56) References Cited

U.S. PATENT DOCUMENTS

| 6,178,194 B1* | 1/2001 | Vasic ............................ 375/136 |
| 2002/0075939 A1* | 6/2002 | Zeira et al. .................... 375/130 |

FOREIGN PATENT DOCUMENTS

| CA | 2679611 A1 | 9/2008 |
| EP | 1912345 A1 | 4/2008 |
| WO | 99/34531 | 7/1999 |

OTHER PUBLICATIONS

3rd Generation Partnership Project. 3GPP TS 36.213, V8.5.0 (Dec. 2008). 3rd Generation Partnership Project; Technical Specification Group Radio Access Network; Evolved Universal Terrestrial Radio Access (E-UTRA); Physical layer procedures (Release 8). Dec. 2008.

* cited by examiner

Primary Examiner — April G Gonzales
(74) Attorney, Agent, or Firm — Coats & Bennett, P.L.L.C.

(57) ABSTRACT

A method of estimating path loss for a channel between a user equipment and a base station of a wireless communication system, the method performed at the base station and comprising the steps of: measuring (302) a signal power PSDrx for a received signal transmitted from the user equipment to the base station on the channel; and estimating (304) a path loss PL*, based on the measured signal power PSDrx and a path loss compensation value α associated with the base station. A base station and a computer readable medium is also described.

22 Claims, 4 Drawing Sheets

METHOD OF ESTIMATING PATH LOSS FOR A CHANNEL

TECHNICAL FIELD

The invention relates to a method, a base station and a computer readable medium for estimating path loss for a channel of a wireless communication system.

BACKGROUND ART

Today wireless communication systems such as cellular telephone and private mobile radio communication systems typically provide for radio telecommunication links to be arranged between a number of base stations and a plurality of subscriber units. Here and in accordance with telecommunication parlance, a subscriber equipment is referred to as a user equipment (UE) while a base station may be referred to as a NodeB or eNodeB.

Some examples of UEs include cellular phones or radios, personal digital assistants (PDAs), MP-3 players, wireless video units, Internet units, computers and other electronic devices capable of mobile communication.

In a wireless communication system, each base station has associated with it a particular geographical coverage area (cell). The cell is defined by a particular range within which the base station can maintain acceptable communications with UEs. Often several cells combine to produce an extensive coverage area and commonly UEs move within as well as between various cells, which includes movement between cells of different service providers. In doing so, UEs encounter varying radio propagation environments in different base station cells.

As radio transmission conditions change for a communication link between a UE and a base station, for example in dependence of how the UE is moved within or between different cells of various base stations, the power requirements for the radio transmission varies if a certain radio transmission quality shall be maintained. Here, the communication link from the base station to the UE is referred to as the downlink channel while the communication link from the UE to the base station is referred to as the uplink channel.

When determining uplink power requirements for a UE, it is possible to examine received downlink signals and extract at least some of the information required to determine the proper uplink transmission power since there is typically a proportionality between the received signal power and the power necessary to use for transmitting a signal. If the transmission power of a signal received at the UE is known, or if there is some way to estimate the transmission power, the necessary transmission power to reply to that transmission can be estimated.

However, for certain types of communication systems, such as systems that use time-division multiplexing to separate downlink and uplink signals, transmission power estimates may be very inaccurate. This is because the accuracy of signal level measurements is affected by the duration of the measurement and the elapsed time since the measurement was last taken. If the duration of the measurement is too short, variations in the measured signal level adversely affect the measurement. If the elapsed time is too long, the measurement becomes less representative of the present state of the signal level due to interim changes in the signal.

For example, in the case of a UE in a time division duplex (TDD) system, the power of the transmission may vary greatly between timeslots as well as within a timeslot. This power variation is affected by various factors such as the physical movement of the UE and by the environment where the base station and the UE is located.

More specifically, if a UE is moving at a moderate speed it is possible to lose significant signal power in several tens of milliseconds. If a radio frame is ten milliseconds long significant signal variations can occur even within the frame. Therefore it is important that path loss measurements (i.e. measurements of how much power of the signal is lost during transmission from a UE to a base station or vice versa) are applied as fast as practical since an instantaneous measurement of signal characteristics can quickly lose its validity.

Furthermore, path loss estimation between a UE and a base stations is an important parameter for several other radio resource management functions, such as handover, link adaptation, scheduling and inter-cell interference co-ordination.

Today methods exist for determining path loss in telecommunication systems employing for example TDD, which is the case for e.g. a Universal Mobile Telecommunication System (UMTS) or a telecommunication system implemented in accordance with the specifications of Third Generation Partnership Project Long Term Evolution release 8 (3PP LTE release 8). Both of these systems use for path loss measurements a downlink pilot signal that is transmitted to all of the UEs.

In detail, for TDD systems used today a UE measures the received signal power of a serving base station's common control physical channel (P-CCPCH) or other pilot channel, and calculates the path loss (for the downlink pilot channel) between the base station and the UE. This has the advantage of providing an accurate path loss measurement immediately after the pilot signal is transmitted. The path loss measurement based on the received signal power is thereafter used to determine the transmit power for uplink physical channels. Examples of such uplink physical channels include the physical uplink shared channel (PUSCH), the dedicated physical channel (DPCH), the physical random access channel (PRACH) and the high speed shared information channel (HS-SICH). As mentioned before, the measured path loss is also transmitted to the base station as an input value in various radio resource management functions.

Even though the example above elucidates problems related to systems that use TDD, similar problem are present in systems that use Frequency Division Duplexing (FDD) where path loss measurements, accordingly, are just as important. In the case of FDD, in addition to the delay between a measurement and its application, there is also a frequency domain separation between uplink and downlink that adds to the inaccuracy when a path loss estimate for the downlink is used to set appropriate transmit power in the uplink.

Hence, in order to obtain proper uplink power control and radio resource management, path loss measurements must be regularly transmitted from UEs to base stations, which is typically done with RRC (Radio Resource Control) reports when certain pre-configured threshold values and time triggering conditions are fulfilled. This means that radio resources are used every time a path loss estimation is reported, which reduces the capacity for transmitting value-adding data which includes e.g. operators' services and various user data transported over the telecommunication system.

SUMMARY

In view of the foregoing, it is an object of the invention to provide an improvement of the above techniques and prior art. More particularly, it is an object to provide a reliable estimation of a path loss for a channel while still not using, in comparison with prior art, to much of the system capacity for sending path loss reports to various base stations.

Hence a method is provided for estimating path loss for a channel between a user equipment and a base station of a wireless communication system, the method performed at the base station and comprising the steps of: measuring a signal power PSDrx for a received signal transmitted from the user equipment to the base station on the channel; and estimating a path loss PL*, based on the measured signal power PSDrx and a path loss compensation value α associated with the base station.

The invention is advantageous in that any signal transmitted from the user equipment and received at the base station may be used for determining path loss, which means that a dedicated path loss report must not be sent from the user equipment to the base station which in turn reduces the load on the communication system. Of course, the method is advantageously complemented with the sending of regular and conventional path loss reports, but the total number of reports is still reduced by using the inventive method.

Since path loss for uplink and downlink channels often correspond, the estimated path loss may be both an estimated uplink path loss and an estimated downlink path loss, which is based on the understanding that uplink and downlink channels usually experience similar signaling conditions (physical surroundings).

The signal power PSDrx is a power value that is measured by the base station, such as a power spectrum density of the uplink channel, a power per resource block or sub-carrier of the uplink channel, or a total power value for the channel which is normalized with the allocated bandwidth of the channel. In brief, the signal power PSDrx is any value measured by base station and representing the effect by which the user equipment transmits a signal to the base station on an uplink channel.

"Path loss" is a value (or variable) that represents how much power of the signal is lost during transmission from the base station to the user equipment, but may also represent how much power of the signal is lost during transmission from the user equipment to the base station. Typically, the path loss value is an effect-indicating value but it may also be a relative value that indicates the path loss in relation to e.g. a nominal user equipment signal transmission power such as the transmission power when no path loss is present.

The path loss compensation value α is associated with the base station which means that the value α is specific for the base station (base station cell) in the communication system. This value α may be set by the operator of the communication system and is set according to typical signal conditions in the cell (coverage area) of the base station. The value α may be set to a fix value or it may be set to be adaptive such that it changes when e.g. traffic load or interference conditions change. In case that base station has several cells, the base station may have a respective α-value for each of its cells, i.e. the base station has at least one cell specific path loss compensation value. In this context, it may be said that the α-value is associated with a cell of the base station, which of course still means that the α-value is associated with the base station since the cell per se is associated with the base station.

The α-value may also be different for different UEs in a cell, but such differences are typically based on an α-value that is specific for the base station cell, i.e. the base station has a basic α-value which is a value that is used for calculating any individual α-values used for different UEs in the cell.

The estimating of the path loss PL* may comprise an increase of the estimated path loss PL* as the signal power PSDrx decreases.

The estimating of the path loss PL* may comprise an increase of the estimated path loss PL* as the path loss compensation value α increases, which gives a relationship between estimated path loss and α-value that is easily understandable for operators of the system as well as for system installation and maintenance personnel.

The estimating of the path loss PL* may comprise an increase of the estimated path loss PL* as a nominal power transmit value P0 associated with the base station increases. Here, the nominal transmit value P0 is a value that is associated with the base station (base station cell) in the sense that it is specific for the base station in the communication system. This value P0 may be set by the operator of the communication system and may be given a value that is typical for signal conditions in the cell (coverage area) of the base station, just like with the α-value. The P0-value may be set to a fix value or it may be set to be adaptive such that it changes when e.g. traffic load or interference conditions change. The P0-value may be different for different UEs in the cell, but such differences are always based on a P0-value that is specific for the base station, i.e. the base station has a basic P0-value which is a value that is included when calculating any individual P0-values used for different UEs in the cell of the base station. As with the α-value, in case that base station has several cells, the base station may have a respective P0-value for each of its cells and it may be said that the P0-value is associated with a cell of the base station.

The path loss PL* may be proportional to $(P0-PSDrx)/(1-\alpha)$. Of course, without departing from the principle of this formula, the formula may be re-written in a different but equivalent form and various constants may be applied, e.g. by adding or multiplying the formula entities with various constants.

The method may comprise the step of determining a weighted path loss PL^ based on the estimated path loss PL* and a reference path loss PL. Typically, the reference path loss is a path loss value that has previously been sent from the user equipment to the base station in a conventional path loss report. By applying weighting, more reliable path loss values may be obtained.

The method may comprise the step of calculating the reference path loss PL based on a power headroom report PH received from the user equipment. Since there is a relationship between path loss and power headroom, a reference path loss may be readily calculated without using extensive resources of the communication system. Here, power headroom is reserved transmission power of the user equipment which is used for enabling the user equipment to maintain a current data transmission rate even if channel conditions worsen, or power headroom is power simply not necessary for transmitting the granted number of bits in the current time instance. A power headroom report is generally done for each user equipment in a base station cell, and once this is done reference path loss may be determined by conventional path loss determining methods that use a power headroom report as input.

The weighted path loss PL^ may be determined by weighting the estimated path loss PL* relatively higher than the reference path loss PL as time increases from when any of a reference path loss report and the power headroom report PH was received from the user equipment. By doing so, a more reliable path loss result is achieved since the reference path loss is representative at the time it is reported and since the measured signal power for the signal transmitted from the user equipment to the base station becomes more representative of a current transmission situation as time increases.

The weighted path loss PL^ may be determined by weighting the estimated path loss PL* relatively higher than the reference path loss PL as the path loss compensation value α decreases.

The weighted path loss PL^ may be determined by weighting the estimated path loss PL* relatively lower than the reference path loss PL as a value representing inaccuracy of signal transmission power of the user equipment increases. Since the calculated path loss estimate is based on the received signal power received at the base station which in turn relates to the actual signal transmission power of the user equipment, an error in the determination of transmission power results in a less reliable estimated path loss which hence should be given a smaller relevance than a reference path loss value.

The path loss compensation value α of the base station may be smaller than one, i.e. a fraction of one. Preferably, the value α is greater than zero.

The method according to the invention may further comprise estimating a power headroom PH* by comprising the steps of: calculating an estimated transmission power P* of the user equipment on the channel, based on the estimated path loss PL*; and estimating the power headroom PH*, based on a difference between a maximum transmission power Pmax of the user equipment and the estimated transmission power P*.

As mentioned, power headroom is reserved transmission power of the user equipment that may be used for enabling the user equipment to maintain a stable data transmission rate even if transmission conditions worsen, or power headroom is power simply not necessary for transmitting the granted number of bits in the current time instance. If the path loss is weighted as described above, i.e. a weighted path loss is determined, the calculating of the estimated transmission power of the user equipment on the channel is preferably based on the weighted path loss, which of course means that the estimated transmission power is also based on the estimated path loss PL*.

Calculating the estimated transmission power of the user equipment based on the estimated path loss is done by inserting the estimated/weighted path loss in a pre-defined formula that is specific for the communication system in use. Once estimated transmission power is known, power headroom is easily calculated since the maximum transmission power of the user equipment is known, which is a value defined, stored in and transmittable from each type of modern user equipment.

Estimating power headroom is advantageous in a manner similar with the estimating of path loss, i.e. it is possible to obtain e.g. proper radio resource management while still not using, in comparison with prior art, to much of the system capacity for sending reports to the base station.

The method may comprise the step of determining a weighted power headroom PH^ based on the estimated power headroom PH* and a power headroom report PH received from the user equipment. Advantages with doing so is related with the advantages of the various weighting techniques for determining a weighted path loss, as power headroom may be derived from the estimated path loss.

In a manner similar with the weighting of the path loss, the weighted power headroom PH^ may be determined by i) weighting the estimated power headroom PH* relatively higher than the power headroom report PH as time increases from when the power headroom report PH or the path loss report was received from the user equipment, ii) weighting the estimated power headroom PH* relatively higher than the power headroom report PH as the cell specific parameter α of the base station decreases, and/or iii) weighting the estimated power headroom PH* relatively lower than the power headroom report PH as a value representing inaccuracy of signal transmission power of the user equipment increases.

According to another aspect of the invention a base station is provided which is arranged to estimate path loss PL* for a channel between a user equipment and a base station of a wireless communication system. The base station is configured to: measure a signal power PSDrx for a received signal transmitted from the user equipment to the base station on the channel; and estimate a path loss PL*, based on the measured signal power PSDrx and a path loss compensation value α associated with the base station.

The estimate of the path loss PL* may comprise increasing the estimated path loss PL* as, in any combination, i) the signal power PSDrx decreases, ii) the path loss compensation value α increases, and/or iii) a nominal power transmit value P0 associated with the base station increases. More specifically, the path loss PL* may be proportional to $(P0-PSDrx)/(1-\alpha)$.

The base station may be configured to determine a weighted path loss PL^ based on the estimated path loss PL* and a reference path loss PL.

The base station may be configured to calculate the reference path loss PL based on a power headroom report PH received from the user equipment. Optionally the reference path loss is sent to the base station from the user equipment in a conventional reference path loss report.

The weighted path loss PL^ may be determined by weighting the estimated path loss PL* relatively higher than the reference path loss PL as i) time increases from when any of the reference path loss report and the power headroom report PH was received from the user equipment, ii) the cell specific parameter α of the base station decreases, and/or iii) a value representing inaccuracy of signal transmission power of the user equipment increases.

The base station may further be configured to estimate a power headroom PH* by: calculating an estimated transmission power P* of the user equipment on the channel, based on the estimated path loss PL*; and estimating the power headroom PH*, based on a difference between a maximum transmission power Pmax of the user equipment and the estimated transmission power P*.

The base station may be configured to determine a weighted power headroom PH^ based on the estimated power headroom PH* and a power headroom report PH received from the user equipment. Of course, the base station may also be configured to determine the weighted power headroom PH^ in manner that corresponds to the weighting described in connection with the above method.

According to yet another aspect of the invention a computer readable medium having stored thereon a computer program having software instructions which when run on a base station cause the base station to perform the steps of: measuring a signal power PSDrx for a received signal transmitted from a user equipment to the base station on a channel between the user equipment and the base station; and estimating a path loss PL*, based on the measured signal power PSDrx and a path loss compensation value α associated with the base station.

The inventive base station and computer readable medium may be configured to execute and/or perform any of the features described above in association with the inventive method, and has the corresponding advantages.

BRIEF DESCRIPTION OF THE DRAWINGS

Embodiments of the invention will now be described, by way of example, with reference to the accompanying schematic drawings, in which.

DETAILED DESCRIPTION OF PREFERRED EMBODIMENTS

Figure 1:
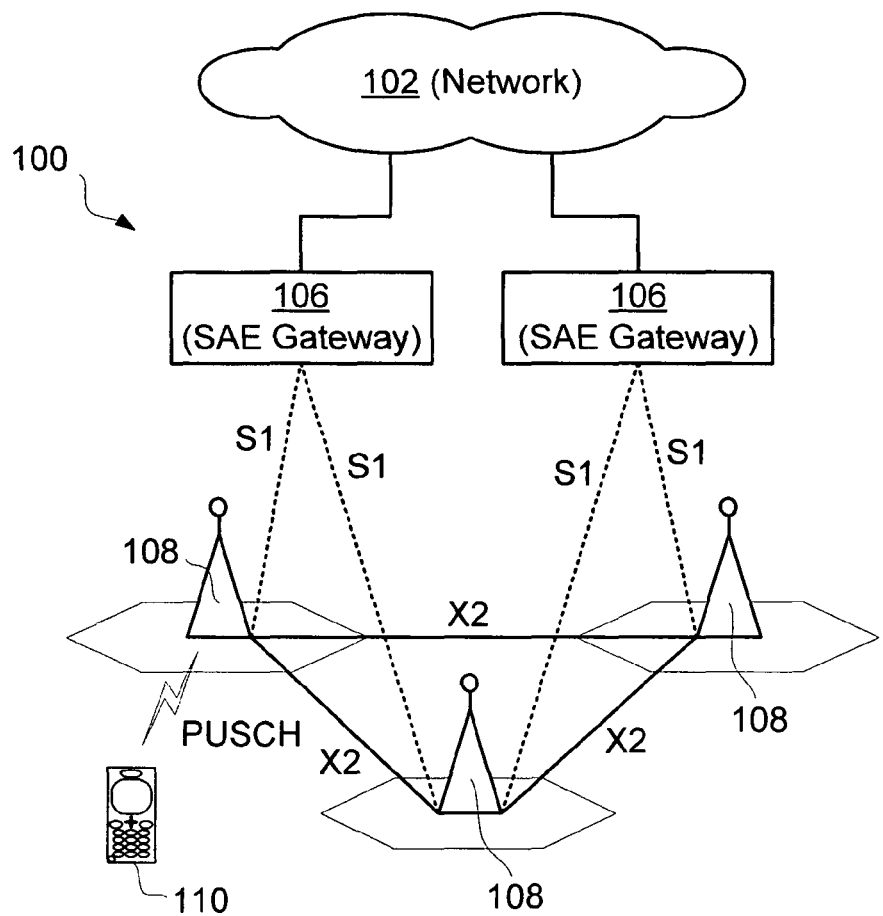
FIG. 1 is a diagram illustrating an LTE/SAE wireless communication network.

With reference to FIG. 1 a system implementing the invention is illustrated. The system 100 is designed and specified in accordance with the next generation of wireless communication networks that is currently ongoing under the auspices of the $3^{rd}$ Generation Partnership Project (3GPP), in an effort known as the Long Term Evolution (LTE) initiative; referred to as 3PP LTE release 8. Along with the definition of new wireless interfaces, a new core network architecture is also being defined in a standardization effort referred to as System Architecture Evolution (SAE).

As shown in FIG. 1, the communication system 100 is an LTE/SAE network that includes at least two types of network elements supporting user and control planes, i.e. an enhanced base station 108 called the Evolved NodeB or "eNodeB", and the SAE Gateway 106. The eNodeB 108 provides the LTE air interface and radio resource management while the SAE Gateway 106 provides a mobility anchor point for the user plane and provides a gateway to an IP service network 102 that may include the Internet, intranets, and other IP-based service networks. Each eNodeB is connected to a SAE Gateway 106 using the S1 interface as defined by 3GPP specifications, and the X2 interface, which also is defined in accordance with 3PP specifications, connects any eNodeB in the network with any other eNodeB that has a neighboring cell. Each of the eNodeBs 108 is capable of wireless communication with a user equipment (UE) 110 as specified by 3PP LTE release 8.

In the description that follows, the present method and apparatus are described in the context of an LTE/SAE wireless network. In this case, many of the control functions described herein reside in an eNodeB 108. However, those skilled in the art will appreciate that the techniques described herein are applicable to other network types and other network configurations. For example, the method and apparatus disclosed herein may be applicable to an evolved High-Speed Packet Access (HSPA) architecture, in which the Radio Network Controller (RNC) is integrated into the NodeB, as well as to a Release 99 GERAN/UTRAN architecture. Thus, the description in terms of LTE/SAE network elements is meant to be illustrative, not limiting.

Figure 2:
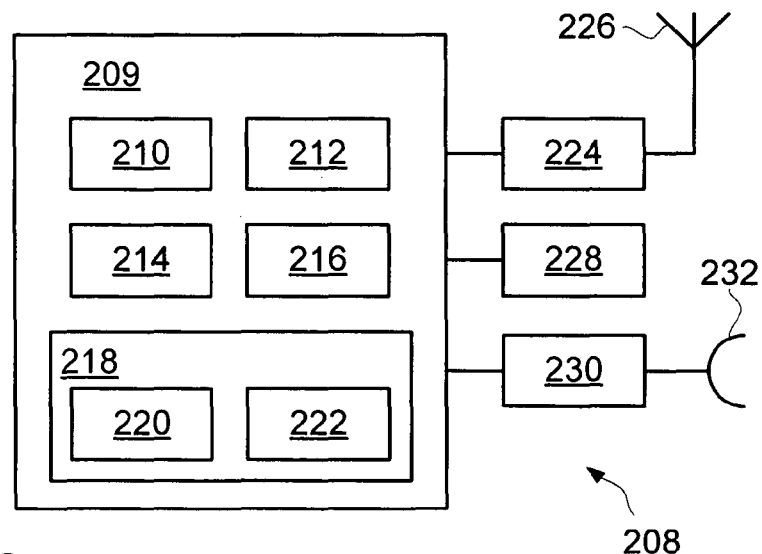
FIG. 2 is a block diagram of an embodiment of a base station implementing the present invention.

Referring now to FIG. 2, an exemplary base station 208 that may be used to implement one or more of the methods described herein is shown. Those skilled in the art will appreciate that the illustrated base station 208 is just one example of a control node for implementing the functionality described herein. Many of the functions of the base station 208 may be implemented using a separate device, which might be co-located with conventional base station equipment or located remotely from the base station. Thus, the control node functionality (the base station functionality) may be part of the eNodeB 108 in the LTE/SAE system of FIG. 1, for example, or may be a separate control function in any other network. For instance, as discussed above, the control node functionality may be part of a radio network controller (RNC) or a base station controller. Thus, a control function may be associated with a single base station or several base stations.

In detail, the exemplary base station 208 of FIG. 2 includes a processing unit 209 configured to communicate with one or more UEs like the UE 110 of FIG. 1 by using a radio transceiver circuitry 224 and an antenna 226. The base station 208 further includes a network interface 228 for communication with other elements of a wireless network, including, in some embodiments, other base stations and access gateways such as the LTE/SAE access gateways 106 and base stations 108 shown in FIG. 1. As indicated, those skilled in the art will appreciate that in some embodiments the base station 208 may comprise an eNodeB for use in an LTE/SAE wireless communication system like the system 100 of FIG. 1, but the methods and apparatus described herein are applicable to other wireless network standards and other network configurations as well.

Generally speaking, the radio transceiver circuitry 224 and portions of the processing unit 209, such as a baseband signal processor 212, are configured to comply with one or more wireless telecommunications standards, such as those promulgated by 3GPP. For instance, by way of non-limiting example, baseband signal processor 212 may be configured to encode and decode signals in accordance with 3GPP LTE standards defining physical layer protocols for Orthogonal Frequency Division Multiple Access (OFDMA)-based downlink signals and Single Carrier Frequency Division Multiple Access (SC-FDMA) uplink signals.

The processing unit 209 includes, in addition to the baseband signal processor 212, a radio resource manager 210, a mobility manager 214, a processing unit 216 for performing other control operations of the base station 208 and a memory 218 which in turn comprises a program code 220 and other data needed for operation of the base station 208, including operational data 222.

The operational data 222 comprises a path loss compensation value $\alpha$ and a nominal power transmit value P0 which values both are specific for the base station 208. These values $\alpha$ and P0 are either adaptive or constant and are typically set by on operator of the communication system the base station 208 is part of. The values $\alpha$, P0 may vary between different base stations of the system or may be same for many base stations, and may be adapted in dependence of a UE the base station communicates with. However, each base station has certain $\alpha$ and P0 values. In this context, it may also be said the values $\alpha$, P0 are set for the cell (coverage area) of the base station. Exactly what static or dynamic (functional) values $\alpha$ and P0 are assigned depends on the environment the base station is located in and may, for example, be empirically defined.

The processing unit 209 has a also a received signal power detector 230 with an antenna 232 that receives a signal from a UE. The detector 230 and antenna 232 are conventional means for detecting the received signal power, which includes, for example, detecting/determining power per resource block or power per sub-carrier of the communication channel used by the UE, or measuring the total signal power and normalize the power with an allocated bandwidth of the communication channel used for transmitting the signal.

Those skilled in the art will appreciate that FIG. 2 depicts a functional representation of the elements of the processing unit 209. Accordingly, each of the pictured processing blocks may in some embodiments directly correspond to one or more commercially available or custom microprocessors, microcontrollers, or digital signal processors. In other embodiments, however, two or more of the functional blocks of the processing unit 209 may be implemented on a single processor, while functions of other blocks are split between two or more processors. Likewise, the memory 218 is representative of the one or more memory devices containing the software, firmware and data used to implement base station functionality in accordance with one or more embodiments described herein. Thus, the memory 218 may include the following types of devices: cache, ROM, PROM, EPROM, EEPROM, flash, SRAM1 and DRAM. The base station 208 and in particular the processing unit 209 may be configured to implement one or more of the methods described herein for estimating path loss for a channel between a UE and a base station of a wireless communication system.

Figure 3:
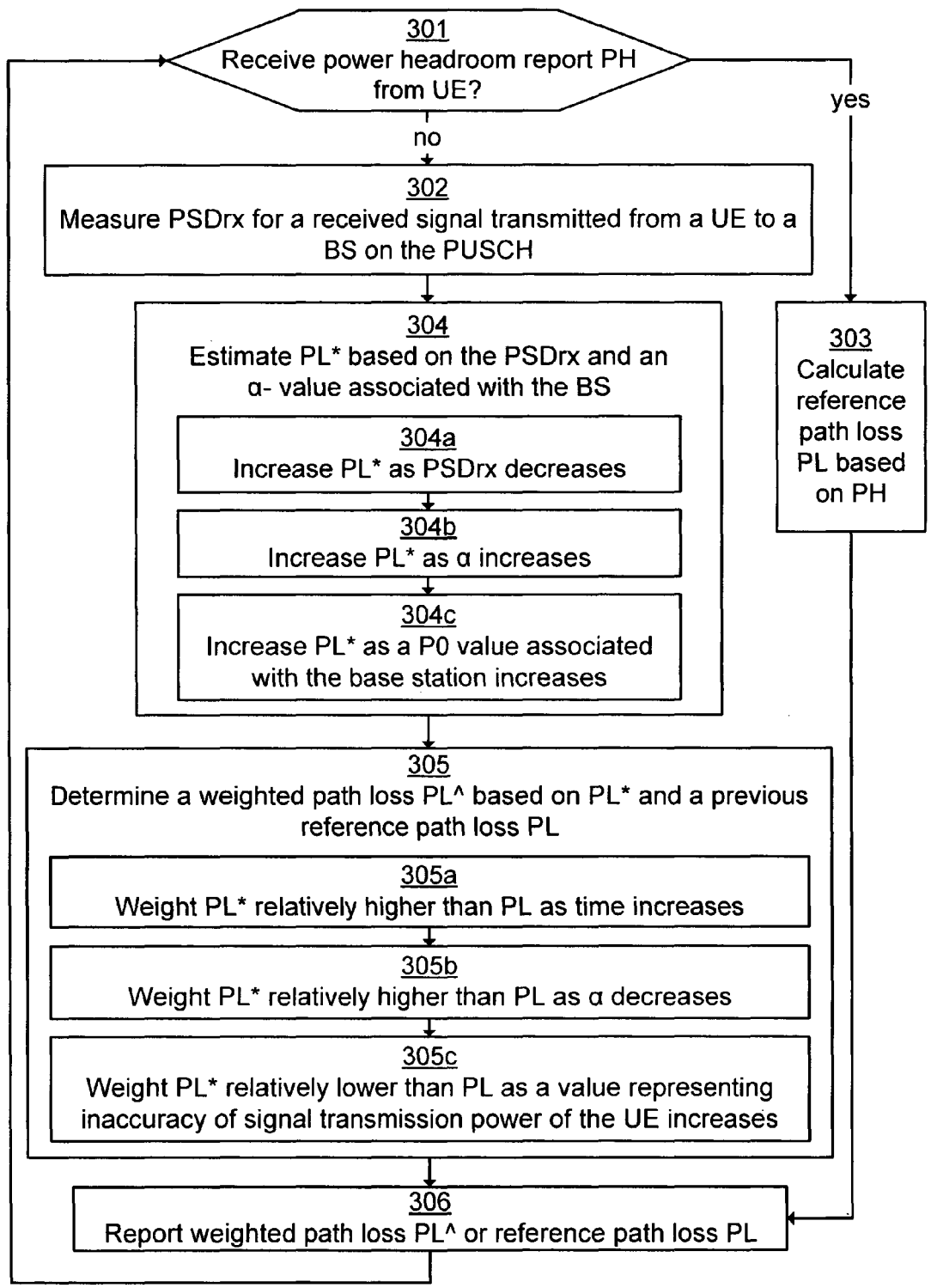
FIG. 3 is a flow diagram of an embodiment of the inventive method.

With further reference to FIG. 3, embodiments of the method performed in the base station 108 of FIG. 1, which here includes the features of the base station 208 and processing unit 209 of FIG. 2. In the method the first step includes, if a certain time (e.g. at a configurable periodicity) has lapsed since a previous conventional power headroom report PH was sent from the UE 110 to the base station 108, receiving 301 a power headroom report PH from the UE 110. If a power headroom report PH was received a reference path loss PL is calculated 303 based on the headroom report and after this the base station 108 report 306 the reference path loss PL to the communication system 100 so that the system 100 may use it when performing functions like handover, link adaptation, scheduling, Intercell Interference Coordination, transmission mode selection, rank and pre-coding matrix selection and inter-cell interference co-ordination.

Instead of receiving a power headroom report in step 301 the base station 108 may receive a conventional path loss report form the UE and then in step 306 report the path loss report as the reference path loss PL.

The steps of receiving a power headroom report PH, determining a reference path loss PL and optionally receiving a path loss report are steps that are common and known within the art.

Once a path loss report is submitted in step 306 the method is performed again at a time interval defined by the systems need of path loss reports or as soon as there is an update to any of the inputs of the algorithm.

If no power headroom report was received in step 301, the next step includes measuring 302 a signal power PSDrx for a received signal that is transmitted from the UE 110 to the base station 108 on an uplink channel. The uplink channel is typically the physical uplink shared channel (PUSCH) of the system 100 but may also be the dedicated physical channel (DPCH), the physical random access channel (PRACH) or the high speed shared information channel (HS-SICH). The previously discussed signal power detector 230 and antenna 232 are used for this measuring.

Next a path loss PL* is estimated 304 based on the measured signal power PSDrx and a path loss compensation value α of the base station 108. The path loss compensation value α is a real value that fulfills the condition:

$$0 <= \alpha < 1 \quad [1]$$

α is set for the base station 108, or more specifically, for the cell of the base station 108. Preferably, a nominal power transmit value P0 of the base station 108 (or the cell of the base station) is also used when determining the estimated path loss PL* value. In detail, the following formula is used when estimating the path loss PL*:

$$PL^* = (P0 - PSDrx)/(1-\alpha) \quad [2]$$

For better understanding of formula [2], it should be understood that a setting of a UE transmit power on the physical uplink shared channel $P_{PUSCH}$ is proportional to the nominal power transmit value P0 and the path loss compensation value α multiplied with a downlink path loss PL that may be calculated in the UE 110, i.e.:

$$P_{PUSCH} \propto P0 + \alpha \cdot PL \quad [3]$$

The full formula on which formula [3] is based on is found in technical specification 3GPP TS 36.213 version 8.4.0 Release 8. Both the UE 110 and base station 108 are configured to fulfill this specification, and since all other values (but P0 and α) used for determining $P_{PUSCHin}$ in accordance with 3GPP TS 36.213 version 8.4.0 Release 8 are known, $P_{PUSCH}$ may be defined as:

$$P_{PUSCH} \propto P0 + \alpha \cdot PL \quad [4]$$

This means that α and P0 represent values that are transmitted from the base station 108 to the UE 110. Then the values of α and P0 are used by the UE 110 for setting the UE 110 transmit power for an uplink channel like the PUSCH.

At the base station 108 the received PSDrx is the same as the UE transmit power $P_{PUSCH}$ with the reduction for path loss PL, i.e.:

$$PSDrx = P_{PUSCH} - PL \quad [5]$$

Formula [5] together with formula [4] gives:

$$PSDrx = P0 + \alpha \cdot PL - PL = P0 + (\alpha - 1) \cdot PL \quad [6]$$

From formula [6] it follows that:

$$PL = (PSDrx - P0)/(\alpha - 1) = (P0 - PSDrx)/(1 - \alpha) \quad [7]$$

Since [7] is a formula that determines an estimated path loss (PL*), equation [2] is valid. To exemplify, if α=0.8 and P0=−70 dBm at the base station and PSDrx=−90 dBm is measured at the base station, then:

$$PL^* = (-70 - -90)/(1 - 0.8) = 20/0.2 = 100 \text{ dB} \quad [8]$$

Figure 4:
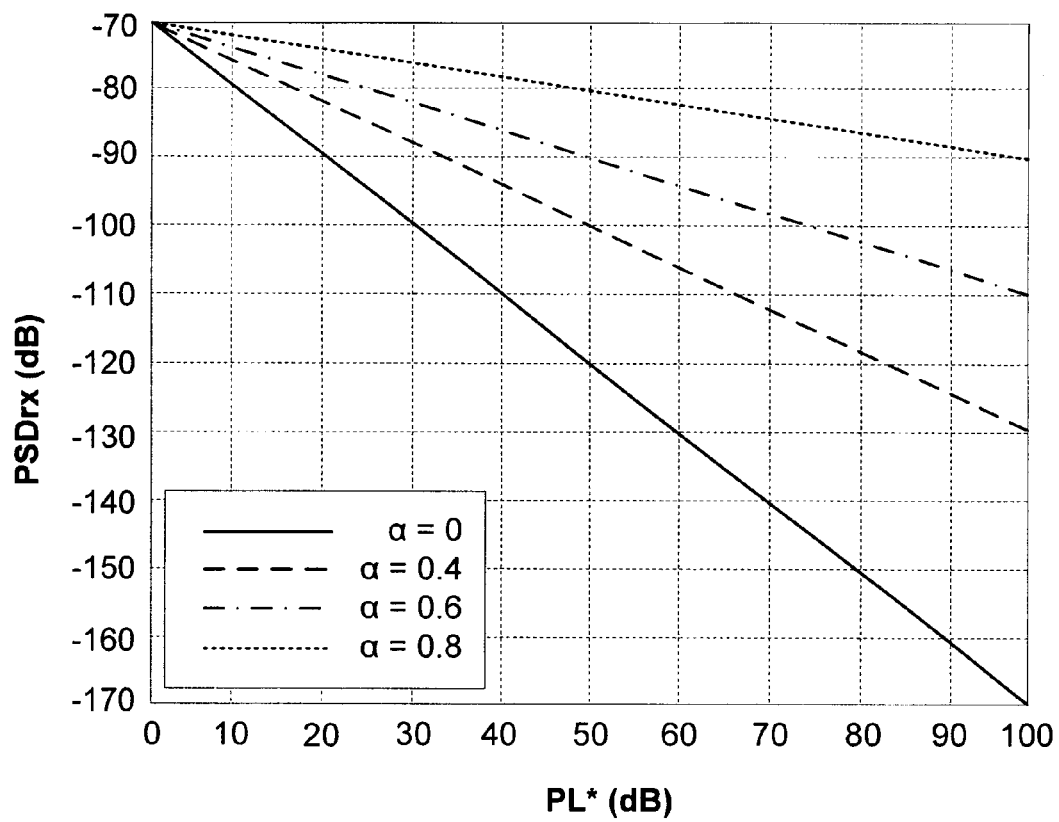
FIG. 4 is shows the effect of various values used in connection with the method of FIG. 3.

For illustrating the effect of the α-value, FIG. 4 shows estimated path loss PL* as a function of received signal power PSDrx when α=(0; 0.4; 0.6; 0.8) and P0 is −70 dBm.

Returning to FIG. 3, from formula [2] it follows that the step of estimating 304 the path loss PL* comprises i) increasing 304a the estimated path loss PL* as the signal power PSDrx decreases, ii) increasing 304b the estimated path loss PL* as the path loss compensation value α increases, and iii) increasing 304c the estimated path loss PL* as the nominal power transmit value P0 associated with the base station 108 increases.

Next the estimated path loss PL* is weighted 305 for obtaining a more reliable path loss value. Here, when weighting the estimated path loss PL*, a new estimated path loss value is obtained which is referred to as a weighted path loss PL^.

The weighted path loss PL^ is determined 305 in dependence of the reference path loss that was obtained in step 303 (optionally received in step 301), and includes i) weighting 305a the estimated path loss PL* relatively higher than the reference path loss PL as time increases from when the power headroom report PH (optionally reference path loss) was received from the UE 110, ii) weighting 305b the estimated path loss PL* relatively higher than the reference path loss PL as the cell specific parameter α of the base station 108 decreases, and weighting 305c the estimated path loss PL* relatively lower than the reference path loss PL as a value representing inaccuracy of signal transmission power of the UE 110 increases.

As an example the following formula may be used for determining a weighted path loss:

$$PL\hat{} = e^{-kt} \cdot PL + (1-e^{-kt}) \cdot PL^* \quad [9]$$

In formula [9] t is the time passed since the last reference path loss PL was determined/obtained and k is given a relatively larger value as a decreases. To take inaccuracy of signal transmission power of the UE 110 into account, k may be decreased as a difference $\Delta_{error}$ between a reference path loss PL and an estimated path loss PL* increases ($\Delta_{error}$=PL−PL*). When doing this, the estimated path loss PL* should be calculated at the time of the determining/obtaining the reference path loss.

Knowledge of the power inaccuracy ($\Delta_{error}$) in the UE can be used in uplink link adaptation and uplink scheduling, where extra care can be taken for very inaccurate UEs. This could e.g. mean an extra link adaptation backoff to avoid excessive retransmissions or to avoid scheduling a very inaccurate UE on a PUSCH edge where it could potentially interfere with the Physical Uplink Control Channel (PUCCH) region in an adjacent base station cell.

Also, in case transmission power tolerances are specified in relation to the power of the UE in a previous subframe (independent of how accurate that power was), knowing the actual UE transmission power in the previous subframe allows the eNodeB to know, with greater accuracy, the power in the present subframe.

Figure 5:
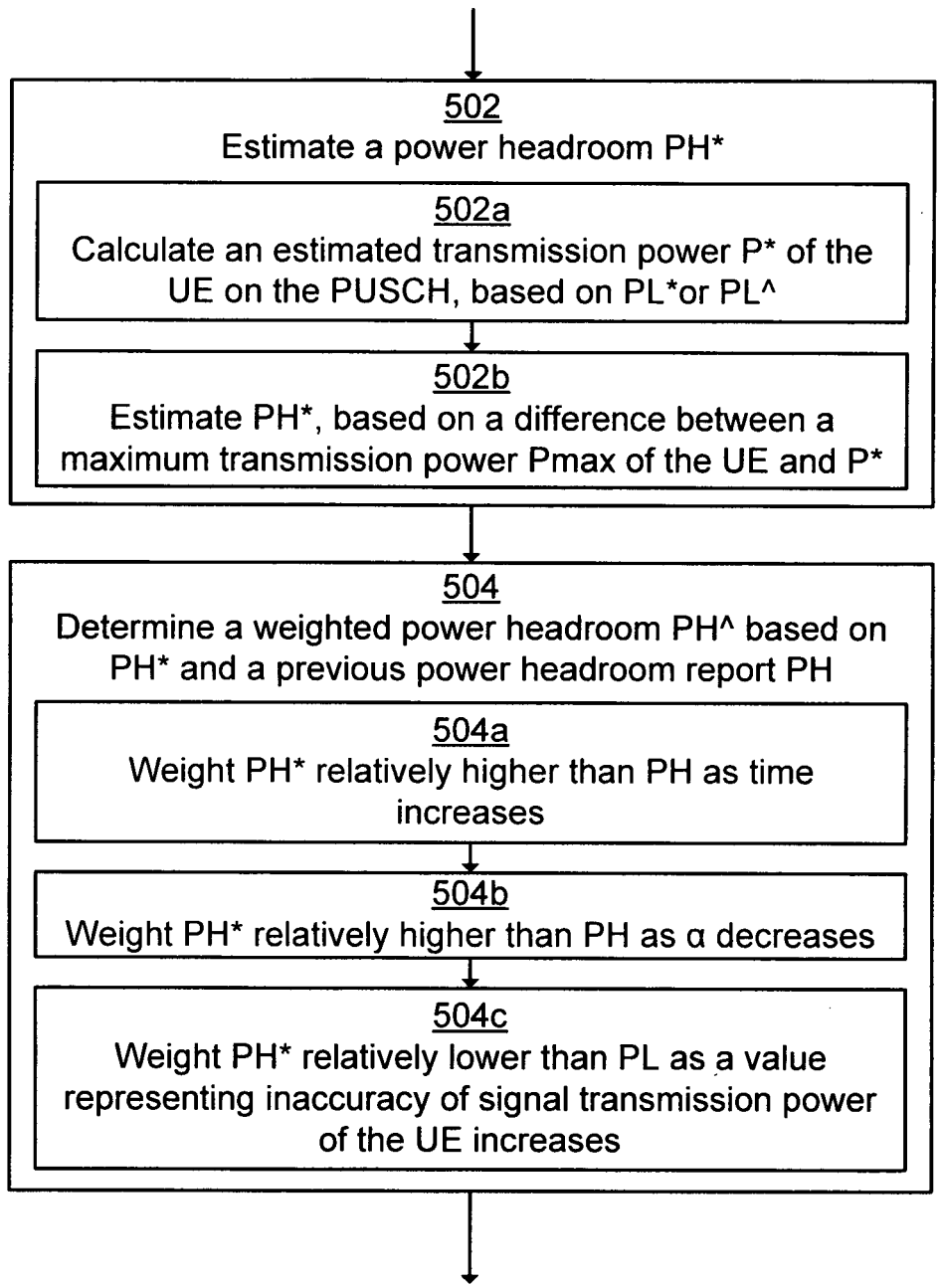
FIG. 5 is a flow diagram of optional steps of the inventive method.

With reference to FIG. 5, optional steps are illustrated where power headroom for the UE is calculated 502. This includes calculation 502*a* of an estimated transmission power P* of the UE 110 on the uplink channel, based on the estimated path loss PL* that is inserted in the following formula:

$$P^* = P_{PUSCH}(i) = \min\{P_{max}, 10 \log_{10}(M_{PUSCH}(i)) + P_{0\_PUSCH}(j) + \alpha(j) \cdot PL + \Delta_{TF}(i) + f(i)\} \text{ [dBm]}, \quad [10]$$

where PL in formula [10] is set to PL* (or even better PL^) and $P_{0\_PUSCH}$ is set to P0. PL* or PL^ and P0 are determined according to the description in connection with FIGS. 1-4, and the other variables of the formula [10] are in accordance with the technical specification 3GPP TS 36.213 version 8.4.0 Release 8, which means that they are known by the base station 108. As the skilled person realizes, formula [3] is based on the principle of formula [10].

The next step is calculation 502*b* of an estimated power headroom PH*, based on a difference between a maximum transmission power Pmax of the UE 110 and the estimated transmission power P* of formula [10], which gives:

$$PH^* = P\max - P^* \quad [11]$$

Pmax is a value of each type of UE and is typically reported by the UE 110 to the base station 108 when communication there between is established. In practice and by using formula [10], formula [11] may be expressed as $$PH^* = P\max - (10 \log_{10}(M_{PUSCH}(i)) + P_{0\_PUSCH}(j) + \alpha(j) \cdot PL + \Delta_{TF}(i) + f(i)) \text{ [dBm]}, \quad [12]$$

To improve the estimated power headroom PH* a weighted power headroom PH^ may be determined in a manner similar with the determining if the weighted path loss PL^, i.e.

$$PH\hat{} = e^{-kt} \cdot PH + (1-e^{-kt}) \cdot PH^* \quad [13]$$

In formula [12] PH is the power headroom report sent from the UE 110 to the base station 108 as discussed in connection with FIG. 3. k and t are determined in a manner that corresponds to the t and k of formula [9].

As the skilled person realizes, the steps of FIG. 5 may be performed at any time after determining the estimated path loss PL* or the weighted path loss PL^, depending on whether the estimated or reference path loss is used.

Computer program code for carrying out methods performed in the previously discussed base station may for development convenience be written in a high-level programming language such as Java, C, and/or C++ but also in other programming languages, such as, but not limited to, interpreted languages.

Some modules or routines may be written in assembly language or even micro-code to enhance performance and/or memory usage. It will be further appreciated that the functionality of any or all of the program modules may also be implemented using discrete hardware components, one or more application specific integrated circuits, or a programmed digital signal processor or microcontroller.

Of course, the various communication interfaces described herein are implemented according to known standards and protocols. In fact, the invention may be implemented on present base stations for mobile communication having a capability of measuring a received signal strength, without needing any hardware adaptation of the base station. Examples of such bases stations are a NodeB in a W-CDMA system or an eNodeB in a 3GPP LTE system.

Although various embodiments of the invention have been described and shown, the invention is not restricted thereto, but may also be embodied in other ways within the scope of the subject-matter defined in the following claims. In particular, the invention may be implemented by using other communication interfaces than the ones mentioned herein.

The invention claimed is:

1. A method of estimating path loss for a channel between a user equipment and a base station of a wireless communication system, the method performed at the base station and comprising:
    measuring a signal power for a received signal transmitted from the user equipment to the base station on the channel, and
    estimating a path loss for the channel, based on the measured signal power and a path loss compensation value associated with the base station.

2. The method according to claim 1, wherein estimating the path loss comprises increasing the estimated path loss as the signal power decreases.

3. The method according to claim 1, wherein estimating the path loss comprises increasing the estimated path loss as the path loss compensation value increases.

4. The method according to claim 1, wherein estimating the path loss comprises increasing the estimated path loss as a nominal power transmit value associated with the base station increases.

5. The method according to claim 4, wherein estimating the path loss comprises estimating the path loss in proportion to (P0−PSDrx)/(1−α), where P0 is the nominal power transmit value, PSDrx is the measured signal power, and α is the path loss compensation value.

6. The method according to claim 1, further comprising determining a weighted path loss based on the estimated path loss and a reference path loss.

7. The method according to claim 6, further comprising calculating the reference path loss based on a power headroom report received from the user equipment.

8. The method according to claim 7, wherein the weighted path loss is determined by weighting the estimated path loss relatively higher than the reference path loss as time increases from when any of a reference path loss report and the power headroom report was received from the user equipment.

9. The method according to claim 6, wherein the weighted path loss is determined by weighting the estimated path loss relatively higher than the reference path loss as the path loss compensation value decreases.

10. The method according to claim 6, wherein the weighted path loss is determined by weighting the estimated path loss relatively lower than the reference path loss as a value representing inaccuracy of signal transmission power of the user equipment increases.

11. The method according to claim 1, wherein the path loss compensation value is smaller than one.

12. The method according to claim 1, further comprising estimating a power headroom by:
 calculating an estimated transmission power of the user equipment on the channel, based on the estimated path loss, and
 estimating the power headroom based on a difference between a maximum transmission power of the user equipment and the estimated transmission power.

13. The method according to claim 12, further comprising determining a weighted power headroom based on the estimated power headroom and a power headroom report received from the user equipment.

14. The method according to claim 1, wherein the path loss compensation value is equal or greater than zero and smaller than one.

15. A base station configured to estimate path loss for a channel between the base station and a user equipment in a wireless communication system, the base station comprising a processing unit configured to:
 measure a signal power for a received signal transmitted from the user equipment to the base station on the channel, and
 estimate a path loss, based on the measured signal power and a path loss compensation value associated with the base station.

16. The base station according to claim 15, wherein the processing unit is configured to increase the estimated path loss as the signal power decreases.

17. The base station according to claim 15, wherein the processing unit is configured to increase the estimated path loss as the path loss compensation value increases.

18. The base station according to claim 15, wherein the processing unit is configured to increase the estimated path loss as a nominal power transmit value associated with the base station increases.

19. The base station according to claim 18, wherein the processing unit is configured to estimate the path loss in proportion to $(P0-PSDrx)/(1-\alpha)$, where P0 is the nominal power transmit value, PSDrx is the measured signal power, and $\alpha$ is the path loss compensation value.

20. The base station according to claim 15, wherein the processing unit is further configured to determine a weighted path loss based on the estimated path loss and a reference path loss.

21. The base station according to claim 15, wherein the path loss compensation value is equal or greater than zero and smaller than one.

22. A computer program product stored on a non-transitory computer readable medium and comprising a computer program instructions that, when run by a processing unit of a base station, cause the base station to estimate path loss for a channel between the base station and a user equipment in a wireless communication system, the computer program instructions causing the base station to:
 measure a signal power for a received signal transmitted from the user equipment to the base station on the channel, and
 estimate a path loss, based on the measured signal power and a path loss compensation value associated with the base station.

* * * * *